Patented July 4, 1939

2,164,705

UNITED STATES PATENT OFFICE 2,164,705

MANUFACTURE OF MELAMINE

Willi Fisch, Riehen, Switzerland, assignor to Society of Chemical Industry in Basle, Basel, Switzerland No Drawing. Application August 12, 1938, Serial No. 224,603. In Switzerland September 3, 1937

2 Claims. (Cl. 260—248)

In the known processes for the manufacture of melamine the product is always obtained in solid form as crystals, a powder or a coherent cake. In order to remove the product from the reaction vessel by way of valves and pipes, as is generally usual in industry, it must be brought either into the form of a solution or a suspension. For the first procedure there has hitherto been lacking a suitable solvent which will dissolve the melamine in sufficient quantity without decomposition whilst the removal of the product as a suspension is only possible when it is present in a fine granular form and even then the passage of suspensions through pipes and especially through valves presents difficulty. The movement of the reaction mass is particularly difficult when the melamine is manufactured by a continuous process in reaction tubes from substances which yield melamine; in this case it is particularly difficult to avoid the danger of stoppage in the pipes and valves. The movement of the material in the form of a solution or suspension has the further disadvantage that the solvent or suspension agent must again be separated from the material to be conveyed.

This invention relates to a process for the manufacture of melamine in which these disadvantages are avoided by obtaining and conveying the melamine in the molten state.

It was not to be expected that melamine could be melted without undergoing decomposition or that it would be possible to convert melamine-forming substances in good yield into molten melamine and to convey the latter from the reaction vessel in this form, for according to statements in the literature melamine sublimes and decomposes with formation of ammonia when heated (compare Richter-Anschütz, Chemie der Kohlenstoffverbindungen 12. edition [1928] vol. 1, page 584, 2nd paragraph under Melamin; also Beilstein III. edition, vol. 1, page 1443, line 5 from below).

It has now been discovered, however, that melamine can be produced in the molten state from melamine-forming substances without decomposition and removed from the reaction vessel in this state by conducting the operation in the presence of ammonia. It is, of course, also possible first to prepare the melamine at a lower temperature and then to heat it to or above its melting temperature. The liquid melamine which is under ammonia pressure may be blown from the reaction vessel through a small outlet into a receiver in which it is rapidly cooled, whereby it is deposited as a fine powder; alternatively, it may be collected in the liquid state in a receiver and then be caused to solidify there by cooling. In this manner it is possible to obtain yields up to 100 per cent depending on the parent materials and on the pressure of the ammonia.

The melting temperature of the reaction product is, of course, dependent on the reaction mixture; it is in the neighborhood of about 350° C. At such a high temperature the reaction is of extraordinarily short duration. Under such conditions continuous operation is very suitable. This may be conducted in known manner, for example by means of a reaction tube.

If the reaction mixture containing melamine is kept for a longer period at or over the melting temperature, the lower limit of the pressure of the ammonia which prevents decomposition of the melamine lies at about 100 atmospheres. If, however, the passage through the high temperature range is effected within a short time, for instance in reaction tubes, in such a way that the velocity of passage is considerably higher than the velocity of decomposition, there are required very considerably lower tensions of ammonia, for instance about 1 atmosphere.

Those parent materials are naturally most suitable which yield no other product in addition to the melamine, such as cyanamide and dicyandiamide. It will be understood, however, that other melamine-forming substances or mixtures of substances are also applicable, for instance ammonium sulfocyanide, sulfocyanuric methyl ester or cyanuric chloride with addition of ammonia and others.

The following examples illustrate the invention, the parts being by weight:—

Example 1

100 parts of dicyandiamide are heated in an autoclave at about 370° C. together with about 8 parts of ammonia. The contents of the autoclave are then blown out into a cooled receiver, the reaction vessel thereby becoming completely emptied. The escaping ammonia is collected. There is found in the receiver a fine pulverulent product, analysis of which shows that it consists of 100 per cent. melamine.

Example 2

An autoclave is completely filled with dicyandiamide and then heated up to 375° C., the contents then being blown out as in Example 1. Ammonia escapes and in the receiver there is collected a product containing nearly 90 per cent. of melamine together with a few per cents of melam. It is also possible to operate by forcing dicyandiamide continuously under a high pressure into a reaction tube heated at about 350° C., liquid melamine together with a small quantity of liberated ammonia being allowed to escape at one end of the tube in such a manner that a high pressure is maintained inside the tube.

*Example 3*

1 part of dicyandiamide is dissolved in 1.5 parts of liquid ammonia in a low pressure autoclave and the solution thus obtained is conveyed by means of a high pressure pump into a reaction tube heated at 380° C. and having an outlet opening into a receiver and controlled by a valve. The pressure in the reaction tube is maintained by means of the valve at about 200 atmospheres. The outlet valve may be of various kinds, for example an adjustable valve or a spring valve which opens automatically at a given pressure. It has also proved advantageous to construct the outlet as a nozzle having a suitably dimensioned orifice, the pressure being adjusted by regulating the rate at which the solution is supplied by the pump.

The reaction mixture is discharged into a cooled receiver in which the solid product can be separated from the gaseous ammonia or there may be used a closed receiver adapted to withstand low pressures, in which case there is obtained a mixture of liquid ammonia and melamine which is subsequently separated. The product consists of practically pure melamine.

*Example 4*

3 parts of cyanamide, together with 1 part of ammonia, are treated in a reaction vessel in the manner indicated in Examples 1 and 2. Up to 98 per cent of the product thus obtained consists of melamine. Cyanamide yields homogeneous solutions even with small proportions of ammonia, for example with a quantity amounting to about 10 per cent of its weight; on this account it is particularly suitable for conversion into melamine by a continuous process.

What I claim is:

1. A process for the manufacture of melamine from substances which form melamine, wherein the melamine is heated in presence of ammonia at least to its melting point in the course of its production and is removed from the reaction vessel whilst in the molten state.

2. In the manufacture of melamine the step of removing the melamine from the reaction vessel in a molten state in the presence of ammonia.

WILLI FISCH.